Oct. 4, 1966

H. NERWIN 3,276,340

CODED ROLL FILM MAGAZINE AND CODE
RESPONSIVE CAMERA MECHANISM

Filed Oct. 30, 1963

HUBERT NERWIN
INVENTOR.

BY R. Frank Smith
Malcolm G. Dunn

ATTORNEYS

HUBERT NERWIN
INVENTOR.

BY R. Frank Smith
Malcolm J. Dunn
ATTORNEYS

United States Patent Office 3,276,340
Patented Oct. 4, 1966

3,276,340
CODED ROLL FILM MAGAZINE AND CODE RESPONSIVE CAMERA MECHANISM
Hubert Nerwin, Rochester, N.Y., assignor to Eastman Kodak Company, Rochester, N.Y., a corporation of New Jersey
Filed Oct. 30, 1963, Ser. No. 320,025
14 Claims. (Cl. 95—31)

The present invention relates to photographic still cameras and roll film magazines for use therein and is particularly directed to roll film magazines provided with physically detectable coding means indicative of certain characteristics of the film within the magazine, e.g., the type and emulsion speed; and to cameras having means for effecting an appropriate adjustment of a camera mechanism in response to the coding means on a magazine operatively connected thereto.

Many popular makes of cameras at present are designed and constructed to receive 35 mm. roll film cassettes or magazines, the dimensions and shapes of the magazine being generally standardized by film manufacturers all over the world. Coding systems indicative of film emulsion speed (ASA Index) or of some other film characteristic have been previously proposed for use in 35 mm. magazines, but these proposed systems usually would require a change in the shape of the magazine in a way that the use of such magazines in present makes of 35 mm. cameras would be impaired. An example of a coding arrangement on a film magazine which extends beyond the dimensions of the magazine per se impairing its use in a conventional camera is shown in the Wilkenson Patent No. 3,025,777, issued March 20, 1962.

Accordingly, and object of the present invention is to provide a coding arrangement on a standard 35 mm. roll film magazine which is dimensionally within the standard magazine profile and which will not impair the normal use of such magazines in cameras which do not have mechanisms adapted to be responsive and reactive to such coding arrangements.

Present day film processing, even on a large scale, requires that each film magazine sent in for processing be visually inspected to determine whether film is black and white or color, the type of film, number of possible exposures and any other pertinent information, and then hand sorted so that film having identical characteristics will be processed together for economical film processing.

Therefore, another object of the invention is to provide on a 35 mm. roll film magazine a coding arrangement which is within the dimensions of the standard film magazine, which will be indicative of certain pertinent characteristics of the film within the magazine and which will be detected by special equipment so that the film magazine will be adapted to be sorted automatically.

A further object is to provide a mechanism within a camera which upon receipt of a coded film magazine will adjust the camera according to the particular characteristic or characteristics of the film being used.

Other objects inherent in the character of the invention described will become apparent to those skilled in the art to which the invention pertains.

In the drawings which form a part of the disclosure of this invention:

FIG. 1 discloses a perspective view of the film magazine or cassette in which an ASA speed notch is provided in the top cover and a processing notch is provided in the bottom cover;

Figure 1:
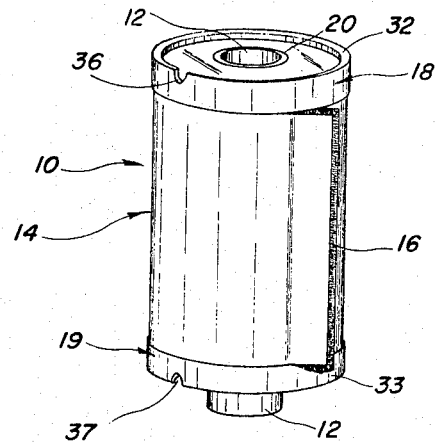
Figure 2:
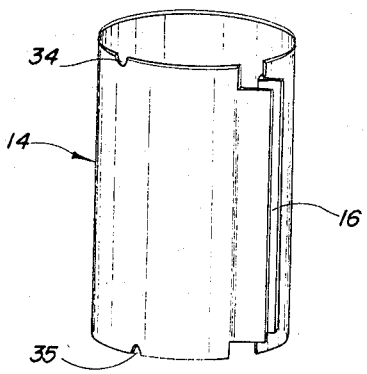
FIG. 2 is a perspective view of the body part of the film magazine shown in FIG. 1.
Figure 4:
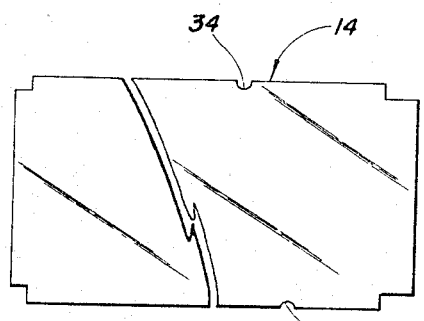
Figure 5:
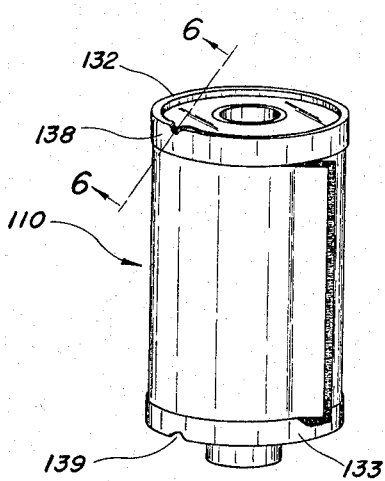
Figure 6:
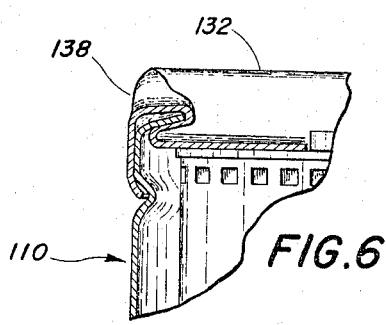
Figure 10:
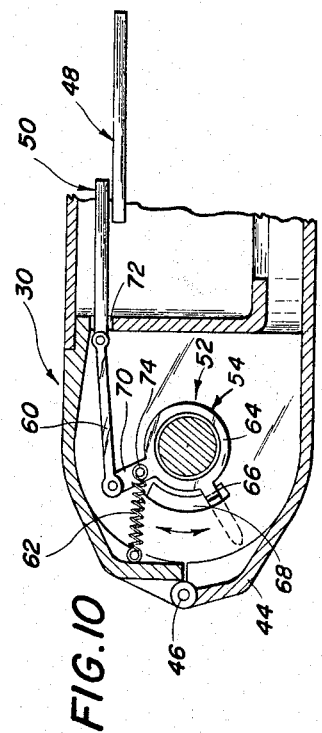
Figure 11:
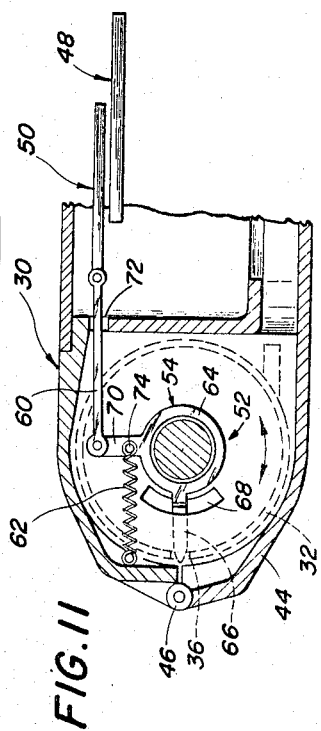
Figure 12:
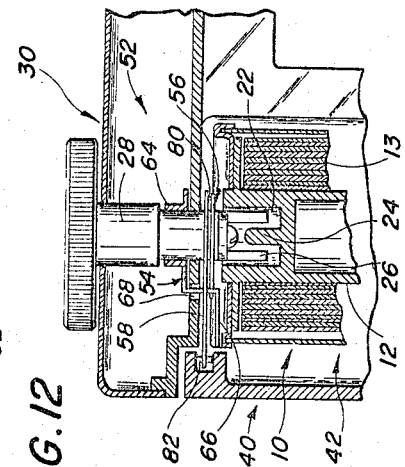
Figure 7:
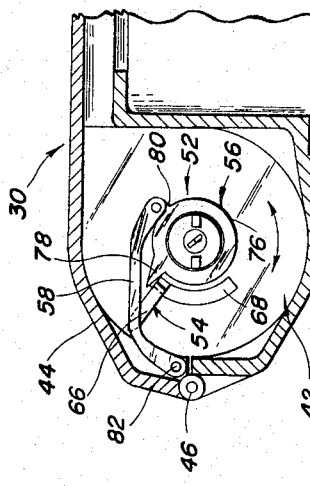
Figure 8:
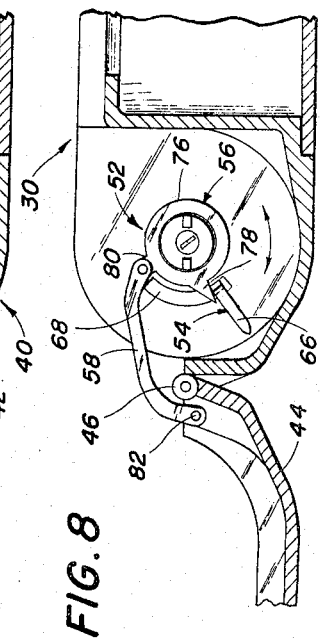
Figure 9:
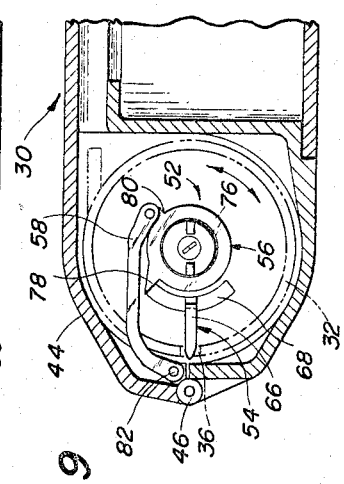

FIG. 4 discloses a blank of the body part of FIG. 2 illustrating the ASA speed notch and processing notch;

FIG. 5 is a modification of the film magazine illustrated in FIG. 1 wherein a code indentation has been made in the rim of the top cover and similarly in the bottom cover of the film cartridge;

FIG. 6 is a fragmentary enlarged sectional view taken along line 6—6 of FIG. 5;

FIG. 7 is a plan view of a camera supply chamber illustrating an ASA pick-up mechanism with the cover of the chamber in closed condition;

FIG. 8 is a top plan view of a camera supply chamber with the cover in open condition ready for insertion of a film magazine;

FIG. 9 is a top plan view of the camera supply chamber in closed condition after insertion of a film magazine;

FIG. 10 is a bottom plan view of the camera supply chamber illustrating the location of the code sensing member and its relation to the linkage connecting the blind for covering a photocell;

FIG. 11 discloses a bottom plan view of the film supply chamber wherein the code sensing member is arrested by the engagement with the ASA indicator of the film magazine, and the corresponding movement of the linkage mechanism and the blind relative to the photocell; and FIG. 12 discloses a sectional view of the ASA pick-up mechanism.

The construction of the film magazine per se is conventional. The particular embodiment illustrated is only one example of a way in which a film magazine of this type may be fabricated. It will be appreciated and understood that although one of the objects of the invention is to provide a coding arrangement which will be within the dimensions of a standard 35 mm. film magazine, that the concept of the invention disclosed would be equally applicable to other types of film magazines.

The camera shown is of the type having an automatic exposure system. The diaphragm (not shown) of the camera may be opened or closed to a predetermined extent dependent upon the intensity of light striking the photocell, the resultant energy from the photocell actuating mechanism (not shown) controlling the opening of the diaphragm. A code sensing mechanism is provided within the camera which detects a code indicator on the film magazine and moves a "blind" or mask to cover the photocell to a greater or lesser extent dependent upon the speed characteristic of the film in the magazine and thus controls the maximum amount of area of the photocell which can be exposed to light. Therefore, the amount of light energization from the photocell or the light sensitivity of the photocell is adjusted in accordance with the type of film being used so that the diaphragm will not be opened to such extent as to overexpose the film.

A code indicator at the opposite end of the film magazine may be used to trigger sorting equipment at a film processing plant.

It should be understood, of course, that although the camera illustrated shows the code sensing mechanism as adjusting the light sensitivity of a photocell, the concept of the invention is not limited to this kind of adjustment and would be equally applicable to the adjustment, directly, of the diaphragm or any other exposure controlling mechanism.

Film magazine

Referring to the drawing, and particularly to FIGS. 1 to 4, the magazine 10 comprises a spool 12 (FIG. 12) upon which film 13 is wound, a generally cylindrical shell or body 14 for housing the spool and film and having an axially extending opening 16 for passage of the film into and out of the magazine, and caps 18, 19 for enclosing the ends of the body and having circular openings 20 for fitting over and mounting the spool ends for free rotation of the spool. The spool, body and caps may be made of any suitable materials, such as metal or plastic.

The spool is recessed at one end, as shown at 22 in FIG. 12, and is provided with a diametrical tongue 24 adapted for engagement with the diametrical slotted end 26 of the winding knob shaft 28 of a camera 30 into which the magazine 10 is loaded for operative connection.

Figure 3:
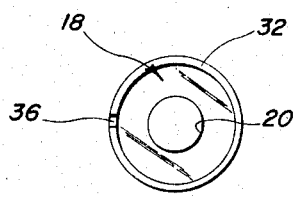
FIG. 3 is a plan view of the magazine cover which may be used for either the top or the bottom of the film magazine disclosed in FIG. 1.

Code indicators are provided along and within the rims 32, 33 of the caps 18, 19 of the film magazine. As shown in FIGS. 2 and 4, surface irregularities or detents in the form of notches 34, 35 may be made in the shell or body of the magazine, and corresponding notches 36, 37 may be made in the rims of the caps, as shown in FIGS. 1 and 3 so that when the shell and caps are assembled the notches in the shell will align with the notches in the caps. The rim of each cap is double walled, as may be seen in perspective in FIG. 1, for example, and each end edge of the body 14 fits between the double walls of the cap rim flush with the undersurface of the rim. Hence, the necessity for providing notches 34, 35 in the body 14 may now be readily perceived.

In another embodiment, represented in FIGS. 5, 6, the magazine 110 may be assembled first and then surface irregularities or detents in the form of indentations 138, 139 are made along and within the rims 132, 133 of the film magazine without penetrating the magazine interior.

The code indicator notch or indentation, as the case may be, is placed along the rim and within the profile of the film magazine a predetermined spaced distance from the axially extending opening 16 in the body of the magazine so that when the film magazine is loaded into a camera and a film is drawn out of the magazine across the exposure aperture (not shown) of the camera for the usual connection to a take-up spool (not shown) the film magazine will be properly aligned with respect to the code sensing mechanism in the camera. Thus, the film magazine is provided with detectable code means disposed in a predetermined angular relationship corresponding to a characteristic of the film in the magazine, such as the emulsion speed.

*Code sensing mechanism*

In FIGS. 7-12, the number 40 indicates that portion of a camera housing which is a chamber 42 for receiving a film magazine. The winding knob shaft 28 at one end of the chamber is axially movable inwardly for drivingly engaging one end of the magazine, and a cover 44 is pivotally hinged at 46 to the housing. The number 48 in FIGS. 10 and 11 indicates a photocell over which a "blind" or mask 50 is adjustably movable.

The code sensing mechanism, indicated generally at 52, is disposed adjacent one end of the film receiving chamber 42, and includes a code sensing member, indicated at 54, and a resetting ring or an abutment member, indicated at 56, both movably mounted on one end of the winding knob shaft. The abutment member 56, a portion of which is pivotally connected by a link 58 to the cover 44 of the camera 30, is moved by the opening movement of the cover along a path from a first location by the closing movement of the cover. The sensing member 54, a portion of which is pivotally connected by a link 60 to the "blind" or mask 50 is urged by a spring 62 toward a first position, and is moved by the abutment member 56 against the tension of the spring toward a second position as the cover is opened. As the cover is closed, the sensing member 54 is spring-urged against the returning abutment member for movement along a path over the end surface of the rib of a coded film magazine until arrested by a code indicator on the rim of the magazine.

The movement of the sensing member 54 by the spring toward the first position causes a corresponding movement of the "blind" or mask 50 over the photocell 48, and the arrestment of the sensing member by the code indicator on the film magazine determines the extent to which the photocell will be sensitive to light.

The sensing member 54 includes: A ring bearing 64 mounted on the winding knob shaft adjacent the end of the chamber; a leg portion 66 offset from the ring bearing for extending through an arcuate slot 68 in the camera housing into the film receiving chamber 42; and an arm extension 70 to which one end of the link 60 is pivotally connected, the other end of the link being pivotally connected to the "blind" or mask 50 through a slot 72 in the side of the chamber. One end of the spring 62 is connected to a pin 74 on the arm extension and the other end is connected to the camera housing.

The abutment member 56 includes: A ring bearing 76 mounted on the winding knob shaft within the film receiving chamber; a nose-like portion 78 for abutting the offset leg portion 66 of the sensing member 54; and an arm extension 80 to which one end of the link 58 is pivotally connected, the other end of the link being pivotally connected to the cover of the camera by a pin 82 (FIGS. 7, 8, 9, 12).

Therefore, the sensing member 54 is moved in a path between two possible positions: The first position representing the highest film emulsion speed possible, as shown in FIG. 7; and the second position representing the lowest film speed possible, as shown in FIG. 8. The sensing member is constructed of spring-like material and is normally biased toward the film magazine so that it will drop into the surface irregularity or detent in the form of the notch 36 or indentation 138 along and within the end surface of the rim of the film magazine.

It will now be apparent that the invention disclosed provides a simple and economical code arrangement on a standard film magazine, the code being within the confine or physical dimensions of the standard magazine. This code arrangement permits the use of the coded magazine in conventional cameras not provided with a code sensing mechanism. The code sensing mechanism is simple to construct and employ in a camera. The code indicator 37 or 139 at the opposite end of the magazine will serve to trigger equipment (not shown) for sorting film magazines having the same film characteristics into separate groups for efficient and economical film processing.

The invention has been described in detail with particular reference to preferred embodiments thereof, but it will be understood that variations and modifications can be effected within the spirit and scope of the invention as described hereinabove and as defined in the appended claims.

I claim:

1. In a photographic camera of the type having an adjustable exposure means, and a roll film magazine adapted to be operatively connected to said camera, the combination comprising:

a camera housing having an open chamber loaded with said film magazine;

said film magazine having a cylindrical body portion and closed ends and being provided with a roll of film therein;

one of said closed ends of said film magazine having a code indicator means within and along its edge and denoting a characteristic of the film contained within the magazine;

a code sensing mechanism for controlling said adjustable exposure means and operatively connected within and to said camera housing and adapted to physically detect the code indicator means on said roll film magazine within said chamber;

said code sensing mechanism comprising:

a sensing member movable in an arcuate path along said one edge of the film magazine and adapted to engage and to be arrested in its movement by said code indicator means on said film magazine, a resetting ring coaxially movable along said path and into engagement with said sensing member in one direction and movable in return along said path in the opposite direction away from said sensing member, spring means biasing said sensing member to one position at one end of said path, and cover means for said camera movable between open and closed conditions with respect to said open chamber and having a link pivotally connected thereto and to the resetting ring so that (a) as the cover means is moved to said open condition, the resetting ring will be moved by the link along said path in said one direction into engagement with said sensing member to move the sensing member along said path against the tension of said spring means, and (b) as the cover means is moved to said closed condition the resetting ring will be moved by the link in the opposite direction in return along said path and the spring means will return the sensing member along said path retaining it in engagement with the resetting ring for movement therewith until the sensing member engages and is arrested in its movement by said code indicator means on the film magazine within said chamber.

2. A photographic camera of the type having a photoelectric exposure system operatively connected to a diaphragm for controlling the opening thereof in accordance with the intensity of light striking a photoelectric cell and having a mask incrementally movable over the photoelectric cell responsive to light intensity in accordance with the emulsion speed of film loaded in operative connection with the camera, the position of said mask being established automatically by the loading of a roll film magazine into a chamber within the camera, said camera being characterized by:

cover means for the camera movable to open and closed conditions;

first and second members movable in opposite directions along a defined path, one of said members adapted to abut and move the other of said members in one direction along said path as said cover means is moved to the open condition in preparation for loading the roll film magazine into the chamber, the other of said members being biased against said one of said members for return movement therewith along said path in the opposite direction as said cover means is moved to the closed condition;

motion transmitting means connecting said cover means and said one of said members;

and motion transmitting means interconnecting said mask and said other of said members;

said roll film magazine having means on the magazine, the location of which constitutes a code indicator denoting an exposure characteristic of the film within the magazine;

said other of said members in its return movement along said path having means for detecting said means on said roll film magazine and for arresting the latter said member in its movement, the mask being moved by its motion transmitting means and arrested in a position over said photoelectric cell according to the location of the code indicator.

3. A photographic camera of the type having an adjustable diaphragm, the opening of which is established automatically by the loading of a roll film magazine into a chamber within the camera, said camera being characterized by:

cover means for the camera movable to open and closed conditions;

first and second members movable in opposite directions along a defined path, one of said members adapted to abut and move the other of said members in one direction along said path as said cover means is moved to the open condition in preparation for loading the roll film magazine into the chamber, the other of said members being biased against said one of said members for return movement therewith along said path in the opposite direction as said cover means is moved to the closed condition;

motion transmitting means connecting said cover means and said one of said movable members;

means operatively connected to said diaphragm for controlling the opening thereof in accordance with the intensity of light emanating from a scene to be photographed, and including motion transmitting means connecting said operatively connected means with said other of said movable members;

said roll film magazine having means on the magazine, the location of which denotes a code indicator for an exposure characteristic of the film within the magazine;

said other of said movable members in its return movement along said path having means for detecting said means on said magazine and for arresting the latter said member in its movement, said operatively connected means being moved simultaneously by its motion transmitting means to an extent corresponding to the extent of movement by said other of said movable members.

4. In a photographic camera of the type having a photoelectric exposure system operatively connected to a diaphragm for controlling the opening thereof in accordance with the intensity of light striking the light-sensitive cell and a mask movable over said light-sensitive cell for controlling the amount of area of the cell responsive to light emanating from a scene to be photographed, said camera having exposure control mechanism responsive to code indicator means on a roll film magazine loaded into operative connection with the camera, the combination comprising:

a camera housing having an open chamber adapted to receive said film magazine;

said film magazine having a cylindrical body portion and being provided with a slot extending axially of its periphery and defining a passageway for the exit and entry of film, and having closed ends at least one of which is provided along and within its edge with a physically detectable code indicator means spaced a predetermined distance from said slot, the location of said indicator means constituting an exposure characteristic of the film contained within said magazine;

sensing means in said camera adapted to be moved in a path along and in engagement with said edge of the roll film magazine until arrested by said code indicator means;

means moving said sensing means along said path in response to the loading of a roll film magazine;

and motion transmitting means connecting said sensing means and said mask so that the extent of movement of the sensing means will be communicated to the mask, the position of said mask relative to the light-sensitive cell being established in accordance with said exposure characteristic of the film in said magazine.

5. A photographic camera responsive to film speed code indicator means on roll film magazines loaded into operative position in the camera, said camera comprising:

a camera housing having at one end a chamber for receiving said film magazine;

a rotatable code sensing means mounted within said chamber and movable along a path between first and second positions;

a spring means biasing said code sensing means to said first position;

rotatable abutment means adapted to be moved into engagement with said code sensing means for moving the latter to said second position against the action of said spring means;

and means adapted to rotate said abutment means and the code sensing means with which the latter abuts to said second position, and to return said abutment means to said first position;

said code sensing means being held in engagement with said abutment means by said spring means as the abutment means returns along said path to said first position until said code sensing means engages and is arrested in its return movement by a code indicator means on a film magazine positioned in said chamber.

6. A photographic camera responsive to film speed code indicator means on roll film magazines loaded into operative position in the camera, said camera comprising:
a camera housing having an open chamber adapted to receive said film magazine and shaft means within said chamber adapted to drivingly engage said roll film magazine;
cover means pivotally hinged to said camera housing for movement to open and closed positions over said open chamber;
and code sensing means mounted on said shaft means and operatively connected to said cover means for movement thereby along a path in which said sensing means is adapted to engage and to be arrested by the code indicator means on a film magazine positioned in said chamber.

7. A photographic camera responsive to film speed code indicator means on roll film magazines loaded into operative position in the camera, said camera comprising:
a camera housing having an open chamber adapted to receive said film magazine;
cover means pivotally hinged to said camera housing to move between open and closed positions in which it uncovers and covers said chamber respectively;
and code sensing means mounted within said chamber and operatively connected to said cover means for movement thereby along an arcuate path in which said sensing means is adapted to engage and to be arrested by a code indicator means on a roll film magazine positioned in said chamber as said cover means is moved from said open position to said closed position.

8. A photographic camera responsive to film speed code indicator means on roll film magazines loaded into operative position in the camera, said camera comprising:
a camera housing having an open chamber adapted to receive said film magazine;
movable code sensing means mounted within said camera chamber;
and means for moving said code sensing means including:
spring means connected at its one end to said code sensing means and at its other end to the camera housing,
a resetting ring rotatably mounted within said chamber and having abutment means,
cover means pivotally hinged to said camera housing for movement to open and closed positions over said open chamber,
link means pivotally connected at its one end to said cover means and at its other end to said resetting ring,
said cover means upon being moved to the open position moving the resetting ring by said link means along a path until its abutment means engages with said code sensing means for moving the latter against the tension of said spring means, said cover means upon being moved to the closed position moving the resetting ring by said link means in return along said path and said spring means adapted to retain said code sensing means in engagement with the abutment means on said resetting ring as both the resetting ring and sensing means return along said path until said code sensing means engages and is arrested by a code indicator means on a film magazine positioned in said chamber.

9. A photographic camera responsive to film speed code indicator means on roll film magazines loaded into operative position in the camera, said camera comprising:
a camera housing having an open chamber adapted to receive a roll film magazine;
code sensing means; and
cover means movably connected to said camera housing for movement to open and closed conditions over said chamber and operatively connected to said code sensing means;
said code sensing means being mounted within said camera chamber and adapted for movement along an arcuate path to one end thereof as said cover means is moved to said open condition and including spring means for returning said code sensing means along said path toward the other end thereof as said cover means is moved to said closed condition, said code sensing means adapted to engage and to be arrested in its return movement along said path by a code indicator means on a roll film magazine positioned in said chamber.

10. In a photographic camera of the type having a photoelectric exposure system operatively connected to a diaphragm for controlling the opening thereof in accordance with the intensity of light striking the light-sensitive cell and a mask movable over said light-sensitive cell for controlling the amount of area of the cell responsive to light emanating from a scene to be photographed, said camera having exposure control mechanism adapted to be responsive to code indicator means on roll film magazines loaded into operative connection with the camera, said camera comprising:
a camera housing having a chamber for receiving one of said roll film magazines;
sensing means in said camera adapted to be moved in a path along one edge of said roll film magazine until arrested by said code indicator means;
means adapted to move said sensing means along said path after a roll film magazine has been loaded into said chamber;
and motion transmitting means connecting said sensing means and said mask so that the extent of movement of the sensing means will be communicated to the mask, the position of said mask relative to the light-sensitive cell being established in accordance with said code indicator means on said magazine.

11. In a photographic camera of the type having a photoelectric exposure system operatively connected to a diaphragm for controlling the opening thereof in accordance with the intensity of light striking the light-sensitive cell and a mask movable over said light-sensitive cell for controlling the amount of area of the cell responsive to light emanating from a scene to be photographed, said camera having exposure control mechanism adapted to be responsive to code indicator means on roll film magazines loaded into operative connection with the camera, said camera comprising:
a camera housing having a chamber adapted to receive said film magazine;
a code sensing means mounted within said chamber and movable along a path between first and second positions;
a spring means biasing said code sensing means to said first position;
abutment means mounted to be moved into engagement with said code sensing means for moving the latter to said second position against the action of said spring means;

and means for moving said abutment means and the code sensing means with which the latter abuts to said second position, and to return said abutment means to said first position;

said code sensing means being operatively connected to said movable mask and being held in engagement with said abutment means by said spring means as the abutment means returns along said path to said first position until said code sensing means engages and is arrested in its return movement by a code indicator means on a film magazine positioned in said chamber, said mask being movable with respect to said light-sensitive cell to an extent corresponding with the extent of movement of said code sensing means as determined by said code indicator on the roll film magazine.

12. In a photographic camera of the type having a photoelectric exposure system operatively connected to a diaphragm for controlling the opening thereof in accordance with the intensity of light striking the light-sensitive cell and a mask movable over said light-sensitive cell for controlling the amount of area of the cell responsive to light emanating from a scene to be photographed, said camera having exposure control mechanism adapted to be responsive to code indicator means on roll film magazines loaded into operative connection with the camera, said camera comprising:

a camera housing having an open chamber adapted to receive said film magazine;

cover means pivotally hinged to said camera housing and adapted to be moved to open and closed positions over said open chamber;

and code sensing means mounted within said chamber and operatively connected to said movable mask and to said cover means for movement by said cover means along a path in which said sensing means is adapted to engage and to be arrested by a code indicator means on roll film magazines positioned in said chamber as said cover means is moved from an open position to a closed position.

13. In a photographic camera of the type having a photoelectric exposure system operatively connected to a diaphragm for controlling the opening thereof in accordance with the intensity of light striking the light-sensitive cell and a mask movable over said light-sensitive cell for controlling the amount of area of the cell responsive to light emanating from a scene to be photographed, said camera having exposure control mechanism adapted to be responsive to code indicator means on roll film magazines loaded into operative connection with the camera, said camera comprising:

a camera housing having an open chamber adapted to receive said film magazine;

and means for moving said code sensing means including:

spring means connected at its one end to said code sensing means and at its other end to the camera housing, a resetting ring rotatably mounted within said chamber and having abutment means, cover means pivotally hinged to said camera housing for movement to open and closed positions under said open chamber, a first link means pivotally connected at its one end to said mask and at its other end to said movable code sensing means, a second link means pivotally connected at its one end to said cover means and at its other end to said resetting ring, said cover means upon being moved to the open position moving the resetting ring by said second link means along a path until its abutment means engages with said code sensing means for moving the latter against the tension of said spring means, said cover means upon being moved to the closed position moving the resetting ring by said second link means in return movement along said path and said spring means adapted to retain said code sensing means in engagement with the abutment means on said resetting ring as both the resetting ring and sensing means return along said path until said code sensing means engages and is arrested by a code indicator means on a film magazine positioned in said chamber, the extent of movement of said code sensing means being transmitted to said mask by said first link means to establish said mask in a predetermined position with respect to said light-sensitive cell.

14. A coded photographic roll film magazine comprising:

a cylindrical body portion having an opening at each end and being adapted for receiving a roll of light-sensitive film therein;

a pair of caps for covering the openings at the ends of said cylindrical body portion; and cooperating notch means on one of the caps and on one edge of the complementary end of said body portion which will receive said one cap for orienting the position of said one cap in accordance with an exposure characteristic of the type of film which will be contained in said film magazine.

References Cited by the Examiner
UNITED STATES PATENTS

| | | | |
|---|---|---|---|
| 2,043,901 | 1/1936 | Mihalyi. | |
| 2,080,055 | 3/1937 | Martin. | |
| 2,186,611 | 1/1940 | Martin | 95—31 X |
| 2,186,613 | 1/1940 | Mihalyi | 95—31 X |
| 2,320,722 | 6/1943 | Frost | 95—31 |
| 2,493,928 | 1/1950 | Rath | 95—10 |
| 2,721,041 | 10/1955 | Nerwin | 242—71.1 |
| 3,025,777 | 3/1962 | Wilkenson | 95—10 |
| 3,083,626 | 4/1963 | Nerwin | 95—10 X |
| 3,111,072 | 12/1963 | Jakob et al. | 95—13 |
| 3,128,058 | 4/1964 | Ringle et al. | 242—71.1 |
| 3,159,357 | 12/1964 | Berlings | 59—31 X |

FOREIGN PATENTS

| | | |
|---|---|---|
| 456,782 | 8/1944 | Belgium. |
| 456,783 | 8/1944 | Belgium. |
| 956,216 | 5/1944 | France. |

NORTON ANSHER, *Primary Examiner.*

EVON C. BLUNK, *Examiner.*

V. A. SMITH, *Assistant Examiner.*